United States Patent
Williams et al.

(10) Patent No.: US 11,176,194 B2
(45) Date of Patent: Nov. 16, 2021

(54) USER CONFIGURABLE RADIO

(71) Applicant: AT&T INTELLECTUAL PROPERTY I, L.P., Atlanta, GA (US)

(72) Inventors: Richard Williams, Morganville, NJ (US); Paul D. Bartoli, Red Bank, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 54 days.

(21) Appl. No.: 16/506,817

(22) Filed: Jul. 9, 2019

(65) Prior Publication Data

US 2019/0332628 A1 Oct. 31, 2019

Related U.S. Application Data

(63) Continuation of application No. 15/372,371, filed on Dec. 7, 2016, now Pat. No. 10,387,488.

(51) Int. Cl.
*G06F 16/638* (2019.01)
*G06F 16/438* (2019.01)
(Continued)

(52) U.S. Cl.
CPC ........ *G06F 16/639* (2019.01); *G06F 16/4387* (2019.01); *H04L 65/601* (2013.01); *H04N 21/812* (2013.01)

(58) Field of Classification Search
CPC ......... G06F 17/30761; G06F 17/30772; G06F 17/30775; G06F 17/30053; G06F 16/4387; G06F 16/639; H04L 65/601; H04L 65/602; H04L 65/604; H04L 21/81; H04L 21/8106; H04L 21/812
See application file for complete search history.

(56) References Cited

U.S. PATENT DOCUMENTS 7,756,743 B1 7/2010 Lapcevic
7,840,691 B1 11/2010 De Bonet et al.
(Continued)

FOREIGN PATENT DOCUMENTS

WO 2012012778 A1 1/2012
WO 2016111872 A1 7/2016

OTHER PUBLICATIONS

"Tune Tracker Systems", [http://www.tunetrackersystems.com/news.html], retrieved on Jun. 28, 2017, 19 pages.
(Continued)

*Primary Examiner* — Linglan E Edwards
(74) *Attorney, Agent, or Firm* — Amin, Turocy & Watson, LLP

(57) ABSTRACT

Playlists comprising media objects can be modified by adding personalized supplemental media objects that can provide a customized entertainment experience. As an example, an application can overlay a playlist on a consumer's device and can call a user-configurable rules engine that can select a supplemental media object (e.g., a pre-recorded and/or dynamically synthesized media file) that is to be played with the media objects. In one example, the supplemental media object can be associated with a user-selected voice personality and can be streamed from a network storage device via a communication network coupled to the consumer device.

20 Claims, 15 Drawing Sheets

(51) Int. Cl.
*H04N 21/81* (2011.01)
*H04L 29/06* (2006.01)

(56) References Cited

U.S. PATENT DOCUMENTS

| | | | |
|---|---|---|---|
| 8,014,761 B2 | 9/2011 | Kelly et al. | |
| 8,310,985 B2 | 11/2012 | Harb | |
| 8,359,382 B1 | 1/2013 | Gailloux et al. | |
| 8,667,161 B2 | 3/2014 | De Bonet et al. | |
| 8,676,900 B2 * | 3/2014 | Yruski | H04L 67/306 709/206 |
| 8,918,333 B2 | 12/2014 | Harb | |
| 8,959,437 B2 * | 2/2015 | Morse | G11B 27/105 715/727 |
| 9,098,180 B1 | 8/2015 | Craig et al. | |
| 9,197,915 B2 | 11/2015 | Hutchings et al. | |
| 9,236,963 B2 | 1/2016 | Gadoury | |
| 9,253,511 B2 * | 2/2016 | Chen | G06F 16/319 |
| 9,268,775 B1 | 2/2016 | De Bonet et al. | |
| 9,286,616 B2 | 3/2016 | Kilar et al. | |
| 9,300,618 B2 | 3/2016 | Lockhart et al. | |
| 9,330,647 B1 | 5/2016 | Bay et al. | |
| 9,348,907 B1 | 5/2016 | Rosenberg et al. | |
| 9,406,341 B2 | 8/2016 | Parekh | |
| 9,614,878 B2 * | 4/2017 | Maskatia | H04N 21/8455 |
| 2005/0044569 A1 * | 2/2005 | Marcus | G06Q 20/123 725/42 |
| 2007/0260460 A1 * | 11/2007 | Hyatt | H04M 1/7243 704/260 |
| 2008/0022208 A1 | 1/2008 | Morse | |
| 2009/0193457 A1 * | 7/2009 | Conn | H04N 21/812 725/34 |
| 2009/0265212 A1 | 10/2009 | Hyman et al. | |
| 2009/0307199 A1 * | 12/2009 | Goodwin | G06F 16/4387 |
| 2010/0064053 A1 | 3/2010 | Bull et al. | |
| 2010/0268360 A1 * | 10/2010 | Ingrassia | G06F 16/635 700/94 |
| 2011/0029637 A1 | 2/2011 | Morse | |
| 2011/0035222 A1 * | 2/2011 | Schiller | G10L 13/00 704/260 |
| 2013/0227013 A1 * | 8/2013 | Maskatia | H04N 21/4104 709/204 |
| 2014/0006559 A1 | 1/2014 | Drapeau et al. | |
| 2014/0119557 A1 * | 5/2014 | Goldstein | H04W 4/80 381/74 |
| 2015/0106394 A1 * | 4/2015 | Otto | G06F 16/685 707/758 |
| 2015/0382042 A1 | 12/2015 | Wagenaar et al. | |
| 2016/0173544 A1 | 6/2016 | DeBonet et al. | |

OTHER PUBLICATIONS

"iBroadcaster iTunes 4PC", Digital JukeBox, [http://store.digitaljukebox.com/ibroadcaster-itunes4pc/], retrieved on Jun. 28, 2017, 1 page.
"Shout!", [http://shoutautomation.com/], retrieved on Jun. 28, 2017, 1 page.
"NexGen Digital", RCS Sound Software, [http://www.rcsworks.com/en/products/nexgen/], retrieved on Jun. 28, 2017, 10 pages.
"Broadcast Automation", Wikipedia, [https://en.m.wikipedia.org/wiki/Broadcast_automation], retrieved on Jun. 28, 2017, 6 pages.
"Voice Tracking", Wikipedia, (https://en.m.wikipedia.org/wiki/Voice-tracking), retrieved on Jun. 28, 2017, 5 pages.
Office Action dated Aug. 3, 2018 for U.S. Appl. No. 15/372,371, 25 pages.
Final Office Action dated Dec. 13, 2018 for U.S. Appl. No. 15/372,371, 23 pages.
Notice of Allowance dated Apr. 5, 2019 for U.S. Appl. No. 15/372,371, 86 pages.

\* cited by examiner

USER CONFIGURABLE RADIO

RELATED APPLICATION

The subject patent application is a continuation of, and claims priority to, U.S. patent application Ser. No. 15/372,371, filed Dec. 7, 2016 and entitled "USER CONFIGURABLE RADIO," the entirety of which application is hereby incorporated by reference herein.

TECHNICAL FIELD

The subject disclosure relates to computer wireless and/or consumer applications, e.g., a user configurable radio.

BACKGROUND

With the proliferation of consumer electronic devices and enhancement of audio coding formats, users can listen to music via most any media device. As network connectivity (e.g., to public networks, such as the Internet) and download speeds improve, music streaming has become very popular. Users can create playlists and listen to music on-demand and/or on the go.

Conventional products provide a next generation of radio services wherein the type (e.g., genre) of songs played can be customized for a particular user. As an example, the radio services can be accessed via a web browser and/or an application installed on a user equipment (UE). The radio services provide streaming music comprising songs associated with a particular genre that has been selected by the user. The user can rate the songs and/or provide feedback relating to the songs played, which can then be utilized to further customize the streaming music. Some of the conventional radio services provide an interruption-free (without advertisements) listening experience for a fee charged to the user. However, the conventional radio services do not provide a complete radio listening experience and are not completely configurable by the user.

DETAILED DESCRIPTION

Figure 1:
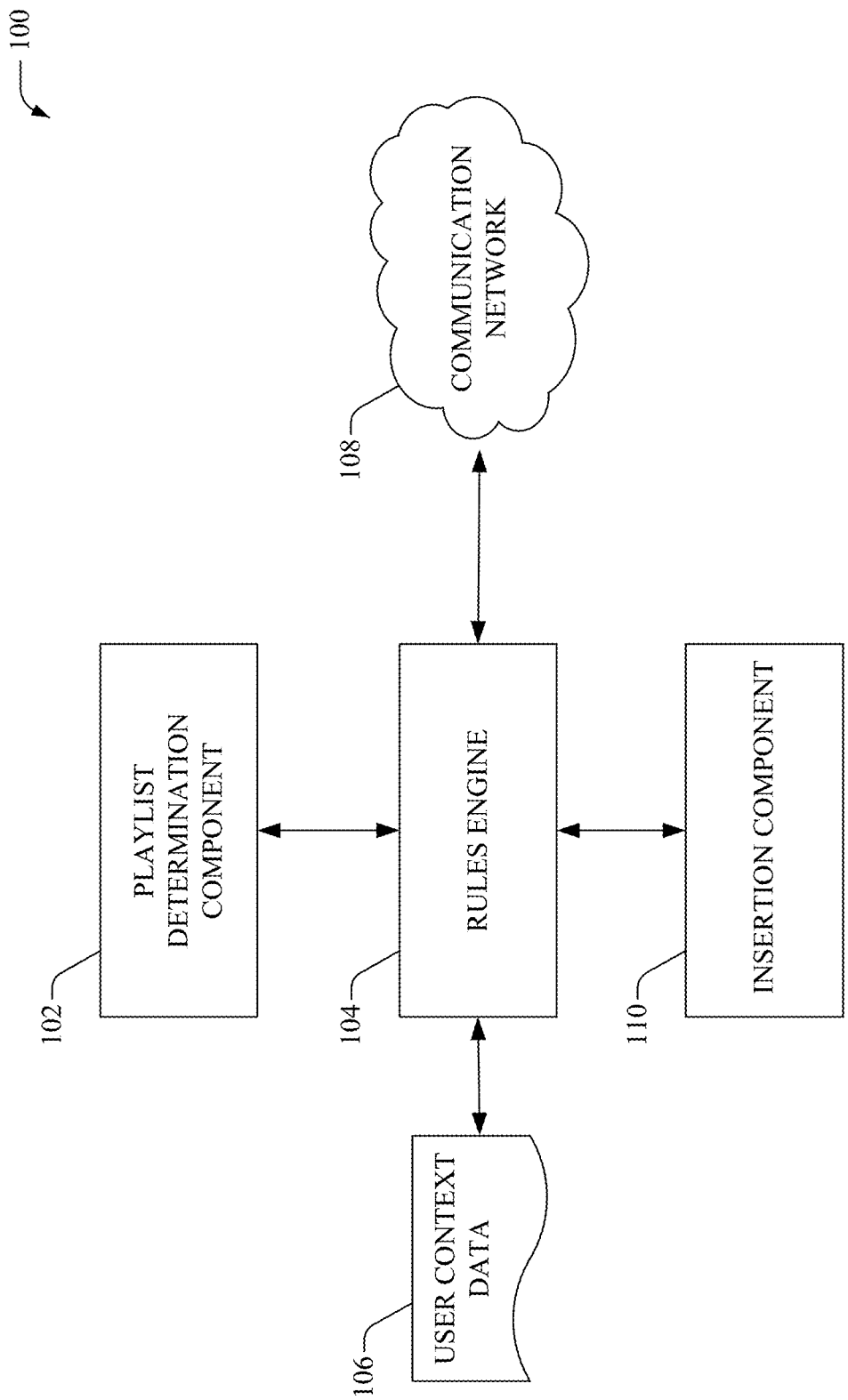
FIG. 1 illustrates an example system that provides a personalized entertainment experience, according to one or more aspects of the disclosed subject matter.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," "controller," "entity," "element," "gateway," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can comprise input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can comprise but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive, electrically erasable programmable read-only memory (EEPROM), etc.). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Further, the terms "user," "subscriber," "consumer," "customer," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

In one aspect, the subject disclosure relates to a system, comprising: a processor and a memory that stores executable instructions that, when executed by the processor, facilitate performance of operations, comprising accessing playlist data indicative of a group of media objects playable via the user equipment to create an entertainment experience. Further, the operations comprise selecting, based on user profile data of a user identity associated with the user equipment, supplemental information comprising a supplemental object that is to be played between two media objects of the group of media objects. In one aspect, the selecting the supplemental information comprises selecting a voice identity to be applicable to the supplemental object, wherein the supplemental object comprises a media file, associated with the voice identity, that is employable to create an enhanced entertainment experience that enhances the entertainment experience by playback of the supplemental information during a transition between the two media objects. Furthermore, the operations comprise receiving the supplemental information from a network device of a communication network coupled to the user equipment.

Further, another aspect of the subject disclosure relates to a method, comprising receiving, by a device comprising a processor, a selection of playlist data indicative of media objects playable via the device to create an entertainment experience and based on user profile data representative of preferences of a user identity associated with the device, determining, by the device, supplemental information comprising a supplemental object that is to be played between a pair of the media objects comprising determining a voice signature to be applied to the supplemental object. Further, the method comprises receiving, by the device, the supplemental information from a network device of a communication network coupled to the device, wherein the supplemental object comprises a media file, to which the voice signature has been applied, that is played during a transition between the pair of the media objects to generate an enhanced entertainment experience that enhances the entertainment experience.

In yet another aspect, the subject disclosure relates to a machine-readable storage medium, comprising executable instructions that, when executed by a processor, facilitate performance of operations, comprising receiving a selection of playlist data indicative of media objects playable via a mobile device to create an entertainment experience, wherein the media objects comprise a first media object, a second media object, and a third media object and based on user profile data representative of a preference of a user identity associated with the mobile device with respect to playback of a group of the media objects, identifying supplemental content comprising a first supplemental object to be played during a first transition from the first media object to the second media object, and a second supplemental object to be played during a second transition from the second media object to the third media object, wherein the identifying comprises determining a voice identity to be applied to the first supplemental object and the second supplemental object. Further, the operations comprise receiving the supplemental content from a network device of a communication network coupled to the mobile device, wherein the supplemental content comprises a first media file representing the first supplemental object, to which the voice identity has been applied, that is played during the first transition, and a second media file representing the second supplemental object, to which the voice identity has been applied, that is played during the second transition, and wherein the supplemental content supplements the entertainment experience with a common entertainment theme based on the voice identity applied to the first supplemental object and the second supplemental object.

Referring initially to FIG. 1, there illustrated is an example system 100 that provides a personalized entertainment experience, according to one or more aspects of the disclosed subject matter. As an example, system 100 can be part of a user equipment (UE), such as, but not limited to most any consumer electronic devices, for example, a tablet computer, a digital media player, a digital photo frame, a digital camera, a media player, a cellular phone, a personal computer, a smart television, a wearable device, a smart phone, a laptop, a gaming system, set top boxes, Internet of Things devices, connected vehicles, at least partially automated vehicles (e.g., drones), etc., and/or can be part of network device(s) coupled to the UE, such as, but not limited to, network devices for example, application servers, corporate servers, gateway device, etc. System 100 can provide an enhanced listening and/or viewing experience by presenting supplemental information that is customized based on user preferences.

In one aspect, a playlist determination component 102 can access a playlist, for example, a sequence of media objects to be played via a UE associated with a subscriber account. The media objects can comprise but are not limited to audio segments (e.g., songs, podcasts, audio books, etc.), images (e.g., photographs), and/or videos (e.g., music videos, news segments, vlogs, videos captured via a camera of the UE, etc.). As an example, one or more of the media objects can be stored in a data store of the UE and/or can be stored within network storage devices (e.g., cloud storage) accessed via an application of the UE. A rules engine 104 can be employed to enhance the media experience by determining supplemental information that can be added to the playlist. As an example, the supplemental information can be determined based on various factors, for example, user context data 106, such as but not limited to, user preferences, UE characteristics, historical data, current date/time, location data, metadata associated with the playlists and/or media objects (e.g., genre, creation date/year, artist information, album information, etc.).

According to an aspect, the rules engine 104 can determine a category and/or genre for supplemental information that is to be played with the media objects. For example, the category and/or genre can comprise comedy, sports, news, weather, trivia, etc. In another aspect, rules engine 104 can determine specific supplemental information (e.g., an audio clip announcing the name of a song that is to be played, an image of the album cover of the song, a video of the artist talking about the song, etc.) that is to be requested. Moreover, the rules engine 104 can generate a query to request the determined data from a network storage device (e.g., cloud storage) accessed via communication network 108. As an example, the communication network 108 can comprise most any communication networks, such as, but not limited to, a cellular network and/or a Wi-Fi network. Further, it is noted that the term "cloud" as used herein can refer to one or more networked devices comprising resources (e.g., processing resource(s), data storage resource(s), etc.) that can reside on-premise or off-premise at a service provider location. Moreover, the cloud can be, but is not limited to, a public cloud, a private cloud, an inter-cloud, or a hybrid cloud.

In one aspect, the rules engine 104 can request the supplemental information associated with a specific voice personality (e.g., digital voice) selected based on the user preferences. For example, the same (and/or similar) information can be recorded and/or generated (e.g., synthesized) by employing different voices, for example, of different genders, having different accents and/or characteristics/traits (e.g., funny, sarcastic, articulate, appropriate for children, etc.) and the like. Moreover, the voice personality can be associated with a person and/or an avatar. A user can select a particular voice personality and subsequently, supplemental information recorded (or generated) in the selected personality's voice can be presented to the user.

In one example, the rules engine 104 can also determine how often the supplemental information can be requested and/or when and/or how often the supplemental data is to be inserted into the playlist. On receiving the supplemental information, an insertion component 110 can be employed to insert the supplemental information at determined positions/locations (e.g., by the rules engine 104) in the playlist and can facilitating presenting the supplemental information, for example, during a transition from one media object to the next media object in the playlist.

Figure 2:
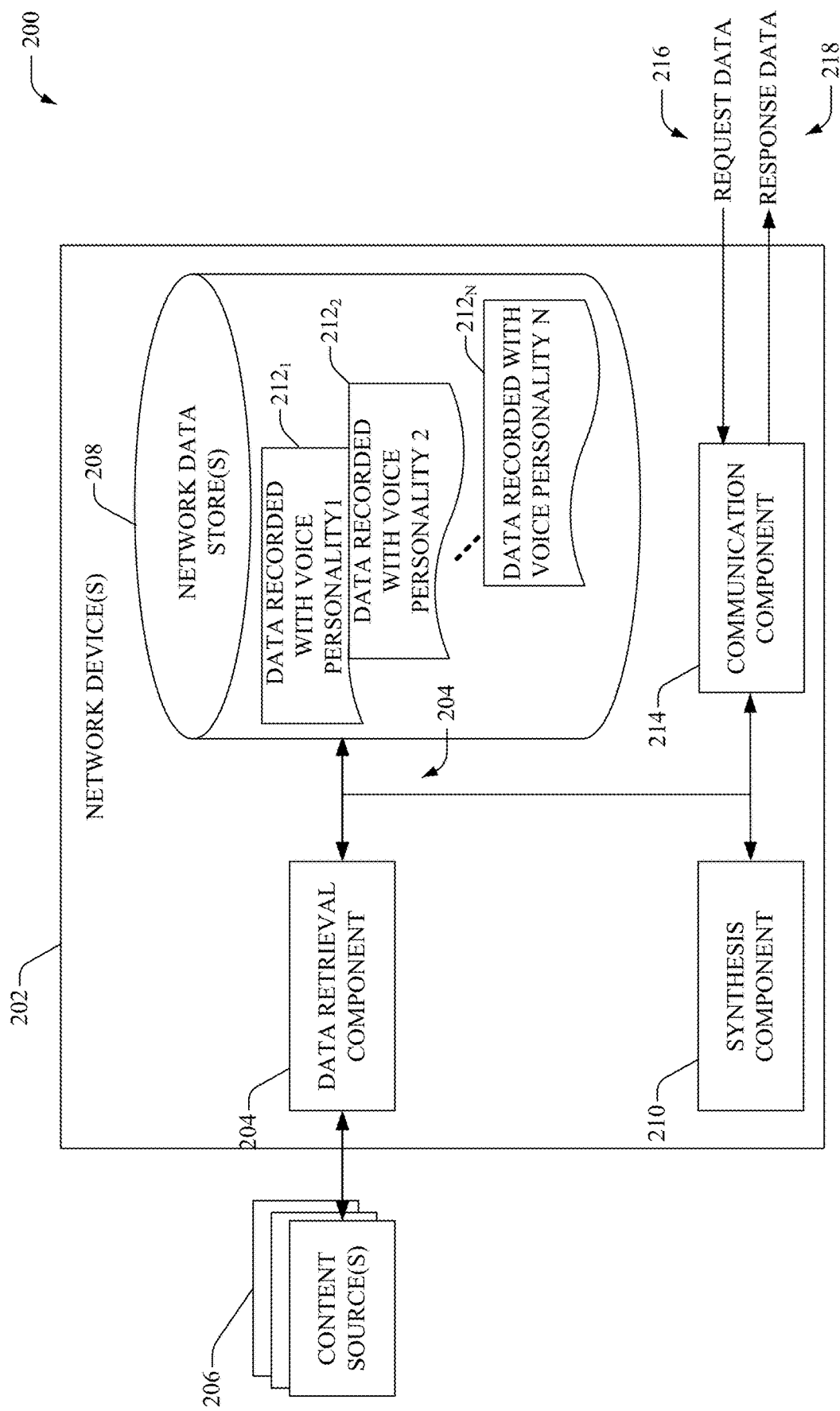
FIG. 2 illustrates an example system for providing supplemental information that is to be added to a playlist.

Referring now to FIG. 2, there illustrated is an example system 200 for providing supplemental information that is to be added to a playlist, in accordance with an aspect of the subject disclosure. In one aspect, system 200 can comprises one or more network device(s) 202 of a cloud. System 200 can be utilized to provide pre-recorded and/or dynamically generated data (e.g., supplemental information, advertisement (ad) and/or promotional data, etc.) to a requesting entity (e.g., rules engine 104 of a UE).

According to an aspect, a data retrieval component 204 can receive information, such as, but not limited to, the supplemental information, ad and/or promotional data, etc., from content sources(s) 206 and can store the received information within a network data store(s) 208. As an example, the supplemental information can comprise, but is not limited to, library data, for example, pre-recorded files that provide musician/artist information, song information, words from the musician (e.g., an audio and/or video clip of the musician talking), "On this Day" information (e.g., data related to an event on a particular date), inspirational quotes, sound bites from movies, songs, videos, podcasts, vlogs, jokes, comedy sketches/skits, etc. In another example, the supplemental information can comprise, but is not limited to, current or live information, for example, ongoing recordings or recently recorded files that provide breaking news, national news, local news, local weather, sports, stock information, traffic, etc. Further, the ad and/or promotional data can comprise, but is not limited to, pre-recorded files that provide nostalgic advertising (e.g., old or famous commercials that were broadcast during a specific time period), national advertising, local advertising, etc. As an example, the content source(s) 206 can comprise most any third-party content provider systems and/or ad servers In an aspect, multiple media files that play the supplemental information and/or ad/promotional data in different voice personalities can be stored in the network data store(s) 208. Moreover, the media files can be received from the content source(s) 206 and/or generated by a synthesis component 210. For example, the same data (e.g., supplemental information and/or ad/promotional data) can be recorded with N voice personalities (wherein N is most any natural number) and stored as files $212_1$-$212_N$ (e.g., audio or video files).

A communication component 214 can receive request data 216 from a UE (e.g., via the rules engine 104). In one example, the request data 216 can comprise a request for supplemental information (and/or ads) relating to a user-defined category and a user-defined voice personality. Further, the request data 216 can comprise context data, such as, but not limited to UE location, user's residence, user demographics data, user preferences, device characteristics, etc. The communication component 214 can analyze the request data 216 and select one or more of stored files $212_1$-$212_N$. Additionally, or alternatively, the communication component 214 can select a file that has been dynamically generated by the synthesis component 210. Further, the communication component 214 can transmit, to the UE, response data 218 comprising the selected file. As an example, the request data 216 and/or response data 218 can be communicated via one or more standard and/or defined API calls.

It is noted that the network data store(s) 208 can comprise volatile memory(s) or nonvolatile memory(s), or can comprise both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory.

Figure 3:
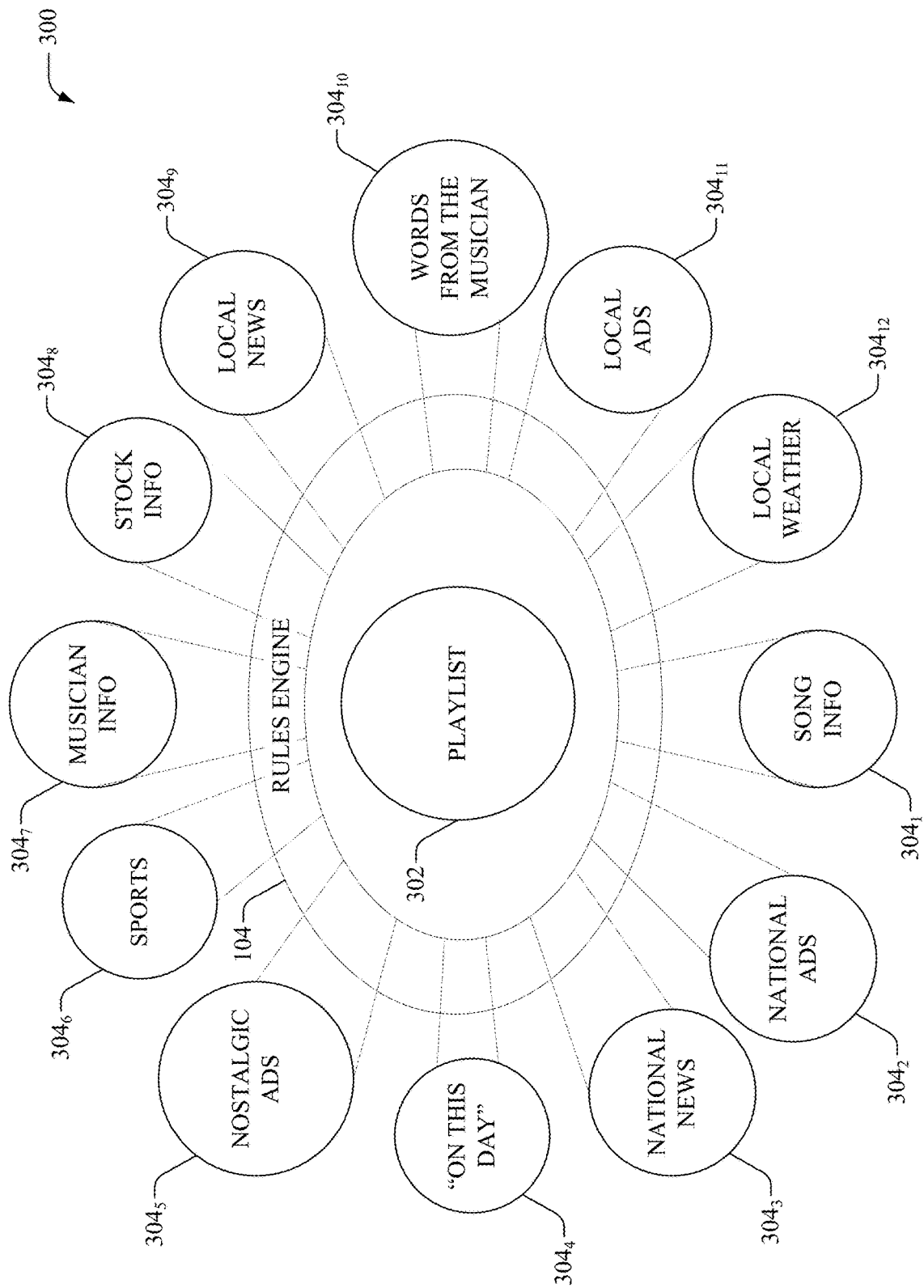
FIG. 3 illustrates an example system for dynamically selecting supplemental data that is to be added to a playlist.

FIG. 3 there illustrated is an example system 300 for dynamically selecting supplemental data that is to be added to a playlist, in accordance with an aspect of the subject disclosure. Users can utilize various media applications (apps) to watch and/or listen to media (e.g., videos, audio clips, images, etc.) stored on and/or streamed by a UE. As an example, the apps can comprise a media player that plays songs/videos stored on the UE and/or a media player that plays songs/videos from a digital media service subscribed by the user (e.g., YouTube®, Pandora® radio, iHeartRadio®, Amazon® music, etc.). Conventional media applications simply provide user-selected media (e.g., songs and/or videos) but do not provide a personalized entertainment experience. In one example, system 300, via the rules engine 104, enables introducing a "Radio Voice" (e.g. a virtual radio jockey (RJ), disc jockey (DJ), and/or video jockey (VJ)) that speaks to the user in between the songs/videos. Moreover, the "Radio Voice" fills in gaps between songs/videos and enhances a personalized entertainment experience provided during transitions between songs/videos. It is noted that the rules engine 104 can comprise functionality as more fully described herein, for example, as described above with regard to system 100.

In an aspect, the rules engine 104 can be overlaid on most any playlist 302 of media objects, for example, defined by a third-party application/service. The rules engine 104 can access the playlist 302 and can perform an analysis to determine supplemental information that can be presented to the user by employing a preferred "Radio Voice." As an example, the rules engine 104 can analyze various context information related to the user and/or UE, such as, but not limited to, attributes from the UE, location data (e.g., Global Positioning system (GPS) coordinates, route information, destination data, etc.), attributes from the playlist 302, for example, metadata related to the playlist 302 (e.g., creation date, number of media items, sequence of media objects, etc.), metadata related to the currently playing (or recently played) media object (e.g., artist information, album information, tags, rank, trending data, similar and/or related media objects, lyrics and/or close captioning, etc.), metadata related to a media object that is to be played next in sequence (e.g., artist information, album information, tags, rank, trending data, similar and/or related media objects, lyrics and/or close captioning, etc.), attribute from a user's profile and/or subscriber account (e.g., type of information that a user would like to be presented, minimum or maximum duration of insertions, frequency of insertions, a selected voice personality, etc.), current date and/or time, etc. Based on the analysis, the rules engine 104 can select one (or more) categories, for example, song (or video) information $304_1$ (e.g., name of and/or trivia related to the previously played or next song in the sequence), national ads $304_2$, national news $304_3$, "on this day" $304_4$ (e.g., historical data and/or facts related to events that occurred on the same day as the current day), nostalgic ads $304_5$ (e.g., ads that were broadcast during a time period related to the songs, album, or artist), sports $304_6$ (e.g., based on UE location and/or user-selected sports teams), musician (or actor) information $304_7$ (e.g., name of and/or trivia related to musician of the previously played or next song in the sequence), stock information $304_8$ (e.g., for top/trending and/or user-selected stocks), local news $304_9$ (e.g., based on UE location and/or user-selected location), words from the musician $304_{10}$ (e.g., an audio/video snippet of the musician), local ads $304_{11}$ (e.g., based on UE location and/or user-selected location), local weather $304_{12}$ (e.g., based on UE location and/or user-selected location), etc. Although only twelve categories are depicted in FIG. 3, it is noted that the subject specification is not limited to twelve categories and that a greater or fewer number of categories can be employed.

On selecting a category, the rules engine 104 can access a supplemental information and/or promotional content (e.g., a media file) related to the selected category from a cloud storage device. The accessed data can be played between media objects of the playlist 302. In one example, the accessed data can be received and stored and/or buffered in a data cache of the UE and played during a transition between the media objects.

Figure 4:
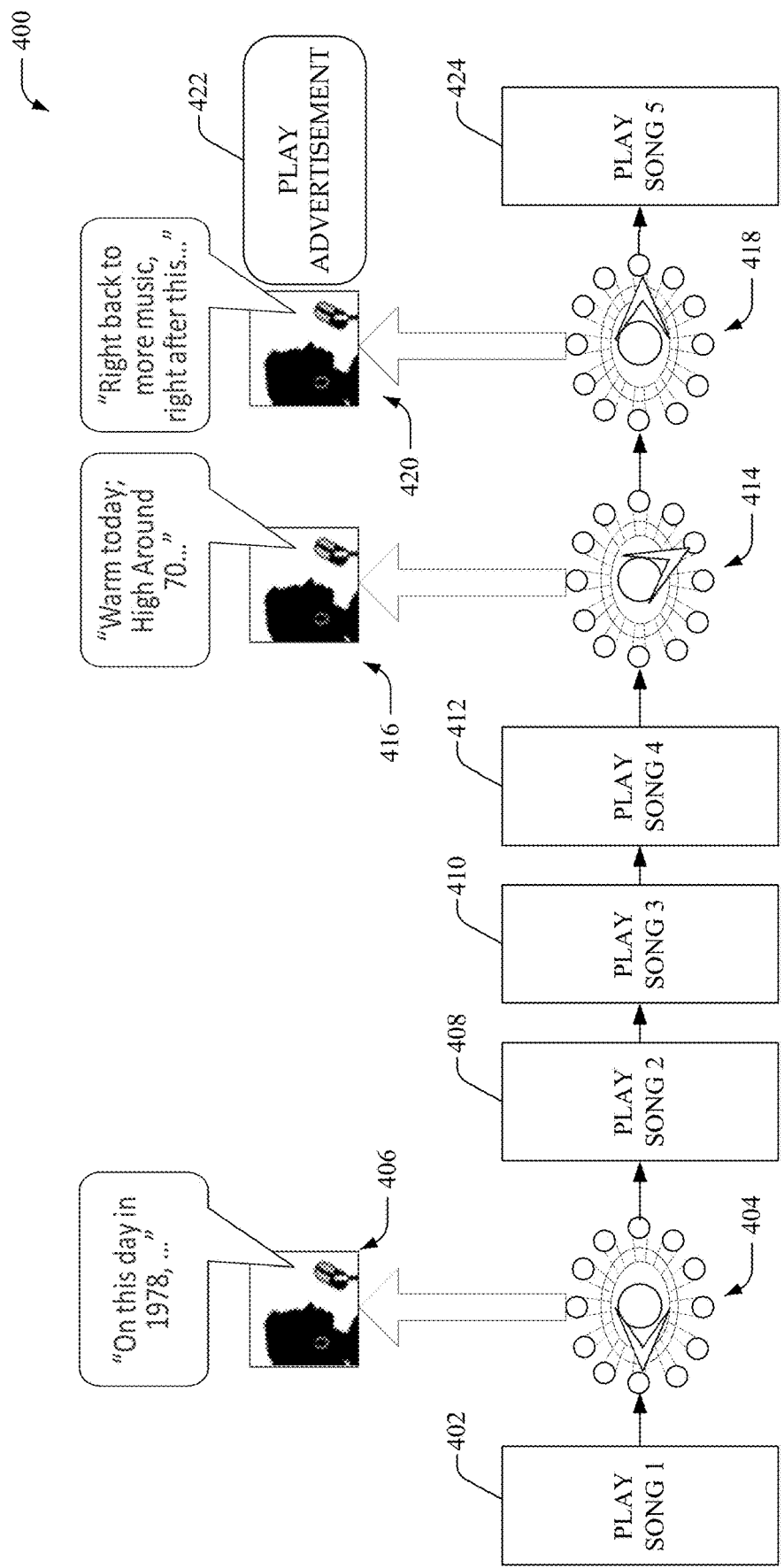
FIG. 4 illustrates an example flow diagram that enhances a listening experience by inserting audio snippets between songs of a playlist.

Referring now to FIG. 4, there illustrated is an example flow diagram 400 that enhances a listening experience by inserting audio snippets between songs of a playlist, according to an aspect of the subject disclosure. As an example, the audio playlist, comprising Songs 1-5, can be accessed and played via a speaker of a UE. Although only five songs are depicted in the playlist, it is noted that the playlist can comprise fewer or greater number of songs. At 402, Song 1 can be played from the playlist, for example, that is stored on and/or accessed via the UE. Although FIG. 4 depicts playing songs within a playlist it is noted that the subject specification is not limited to songs and most any audio file (e.g., a podcast or portions thereof, one or more chapters of an audio book, a recorded speech, a voice recording captured by a microphone of the UE, etc.) can be played. At 404, the rules engine 104 can determine supplemental information (e.g., a supplemental media object) that is to be played during the transition from Song 1 to Song 2.

In one example, the rules engine 104 can determine the supplemental information based on attributes, such as, but not limited to UE, location data, metadata related to Song 1 and/or Song 2 (e.g., artist information, album information, tags, rank, trending data, similar and/or related media objects, lyrics and/or close captioning, etc.), user's preferences, current date and/or time, etc. In this example scenario, the rules engine 104 can select an "On this day" information category based on an analysis of the attributes. At 406, an audio file, related to "On this day" information and received from a network storage device, can be played. In one aspect, the audio file can comprise an audio snippet pre-recoded (or dynamically synthesized) by a user-selected voice personality (e.g., selected RJ/DJ). After playing the audio file, the playlist can be resumed and Songs 2-4 can be played at 404-412. Further, at 414, the rules engine 104 can make another determination regarding supplemental information that is to be played during the transition from Song 4 to Song 5. In this example scenario, the rules engine 104 can select a "weather" information category based on an analysis of the attributes and at 416, an audio file, related to "weather" information and received from the network storage device, can be played. In one aspect, the audio file can comprise an audio snippet pre-recoded (or dynamically synthesized) by a user-selected voice personality (e.g., selected RJ/DJ). After playing the audio file, at 418, the rules engine 104 can make yet another determination regarding an ad that is to be played during the transition from Song 4 to Song 5. At 420, an audio file (e.g., pre-recoded and/or dynamically synthesized by a user-selected voice personality) that introduces the advertisement (e.g. "back to music after these words from our sponsors") can also be received from the network storage device and played. At 422, an ad can be received from the network storage device and played. In one aspect, the advertisement can comprise a nostalgic ad. For example, metadata indicative of a time period (e.g., date of creation, publishing, etc.) associated with Song 4 and/or Song 5 can be utilized to determine an ad (e.g., nostalgic ad) that was originally broadcasted/utilized during the time period. Further, at 424, Song 5 can be played.

In one aspect, the rules engine 104 can determine a frequency and/or timing of inserting the audio files (e.g., at 404, 414, 418) based on user preferences and/or most any machine learning techniques. Further, it is noted that the rules engine 104 can select one of the user-preferred categories (e.g., at 404, 414, 418) based on attributes and in a defined sequence or in a random manner. Although not shown in FIG. 4, the rules engine 104 can select audio files (e.g., at 404, 414, 418) that are related to each other or related to a common theme. For example, the audio files played at 416 and/or 420 can be a continuation of the audio file played at 406. Furthermore, although FIG. 4 depicts that the rules engine 104 determines and/or retrieves the supplemental information subsequent to playing a song, it is noted that the subject specification is not that limited and that the rules engine 104 can determine and/or retrieve the supplemental information at most any time, for example, prior to or during an initiation of the playlist, during playback of a song, etc.

Figure 5:
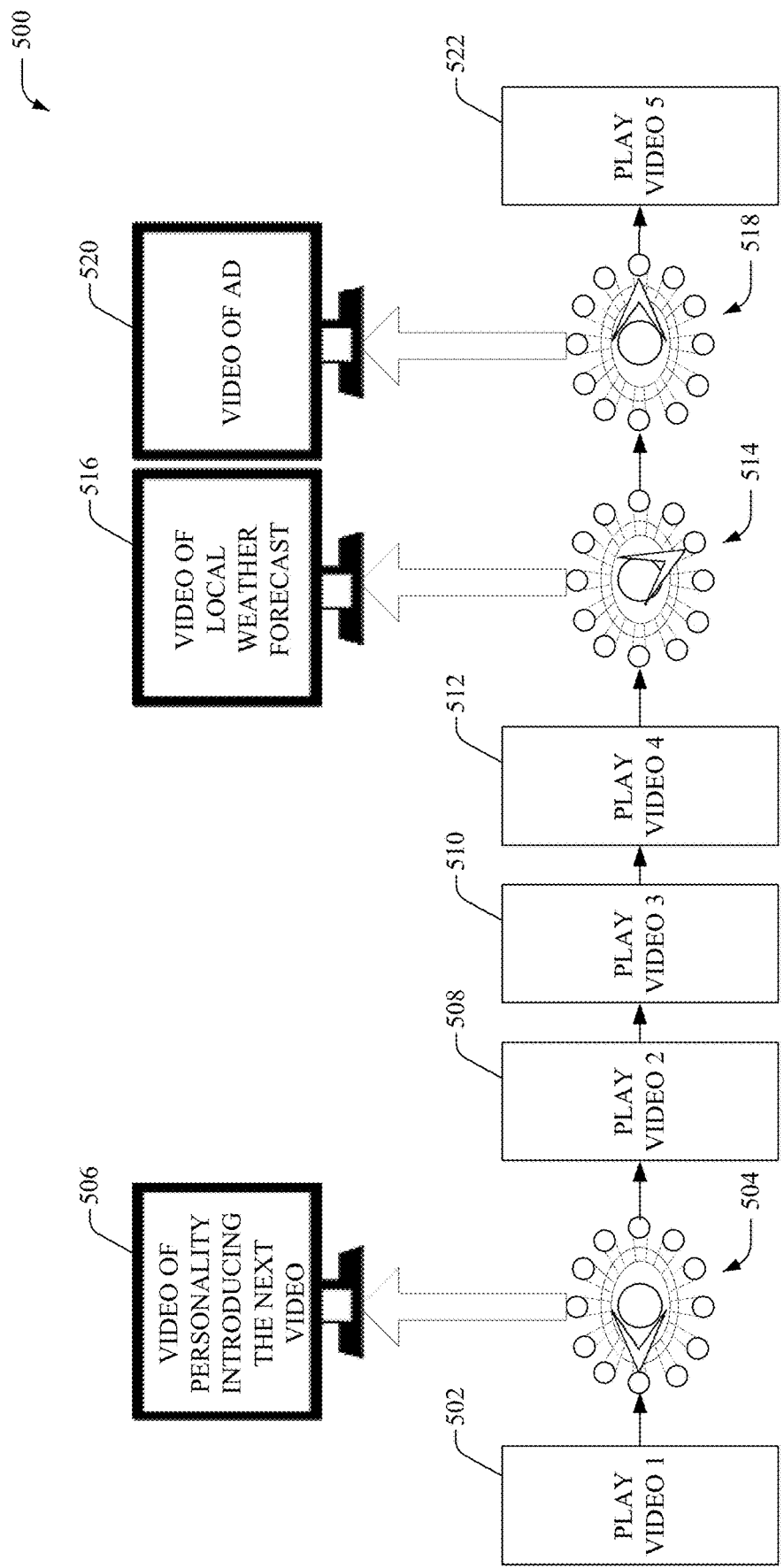
FIG. 5 illustrates an example flow diagram that enhances a visual experience by inserting video snippets between videos of a playlist.

Referring now to FIG. 5, there illustrated is an example flow diagram 500 that enhances a visual experience by inserting video snippets between videos of a playlist, according to an aspect of the subject disclosure. As an example, the playlist comprising Videos 1-5 can be accessed and played via an output interface (e.g., screen, monitor, etc.) of a UE. Although only five videos are depicted in the playlist, it is noted that the playlist can comprise fewer or greater number of videos. At 502, Video 1 can be played from the playlist, for example, that is stored on and/or accessed via a UE. Further, at 504, the rules engine 104 can determine supplemental information that is to be played during the transition from Video 1 to Video 2. As an example, the rules engine 104 can determine the supplemental information based on attributes, such as, but not limited to UE, location data, metadata related to Video 1 and/or Video 2 (e.g., data related to artist, actor, director, producer, etc. of the video, tags, rank, trending data, similar or related videos, close captioning, etc.), user's preferences, current date and/or time, etc. In this example scenario, the rules engine 104 can select a "Video introduction" information category based on an analysis of the attributes. At 506, a video file, for example, wherein a user-selected personality (e.g., actor or avatar) introduces the next video by saying "Coming up next is a scene from the movie The Godfather . . . ," can be received from a network storage device and played via the output interface. In one example, the video file can be played via the same media player and/or interface that is employed to play the Videos 1-5. In another example, the video file can be played in a pop-up windows or most any other graphical user interface (GUI) element.

After playing the video file, the playlist can be resumed and Videos 2-4 can be played at 504-512. Further, at 514, the rules engine 104 can make another determination regarding supplemental information that is to be played during the transition from Video 4 to Video 5. In this example scenario, the rules engine 104 can select a "weather" information category based on an analysis of the attributes and at 416, a video file, related to "weather" information and received from the network storage device, can be played. After playing the video file, at 518, the rules engine 104 can make yet another determination regarding an ad that is to be played during the transition from Song 4 to Song 5. At 520, a video of the ad can be received from the network storage device and played. In one aspect, the ad can comprise a nostalgic ad that can be selected based on metadata indicative of a time period (e.g., date of creation, publishing, etc.) associated with Video 4 and/or Video 5. Further, at 522, Video 5 can be played.

Although not shown in FIG. 5, the rules engine 104 can select video files (e.g., at 504, 514, 518) that are related to each other and/or related to a common theme. For example, the video files played at 516 and/or 520 can be a continuation of the video file played at 506. Further, it is noted that although FIG. 4 depicts an audio playlist and FIG. 5 depicts a video playlist, the playlist can be a combination of audio and video clips and the supplemental information can also be combination of audio and/or video files.

Figure 6A:
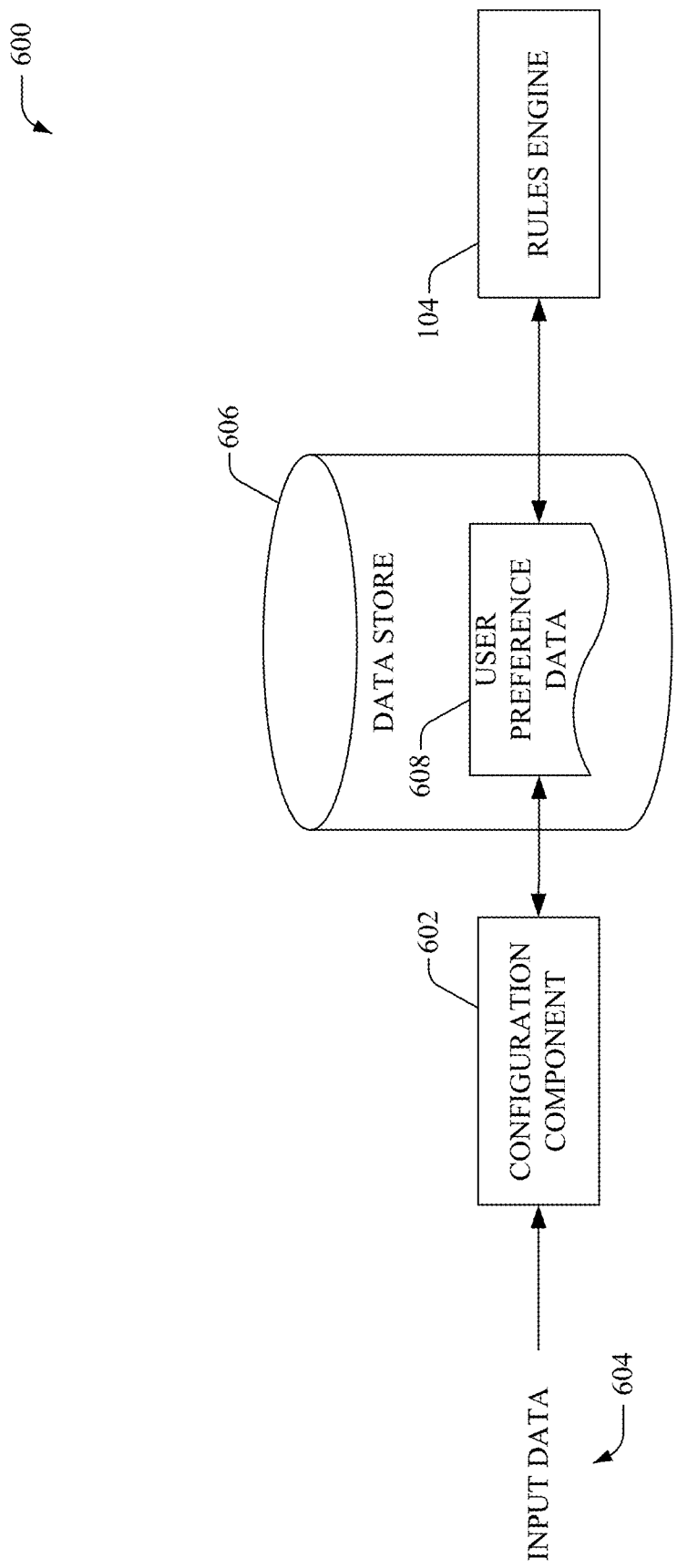
FIGS. 6A-6C illustrates example systems for configuring an enhanced entertainment system, according to aspects of the disclosed subject matter.
Figure 6B:
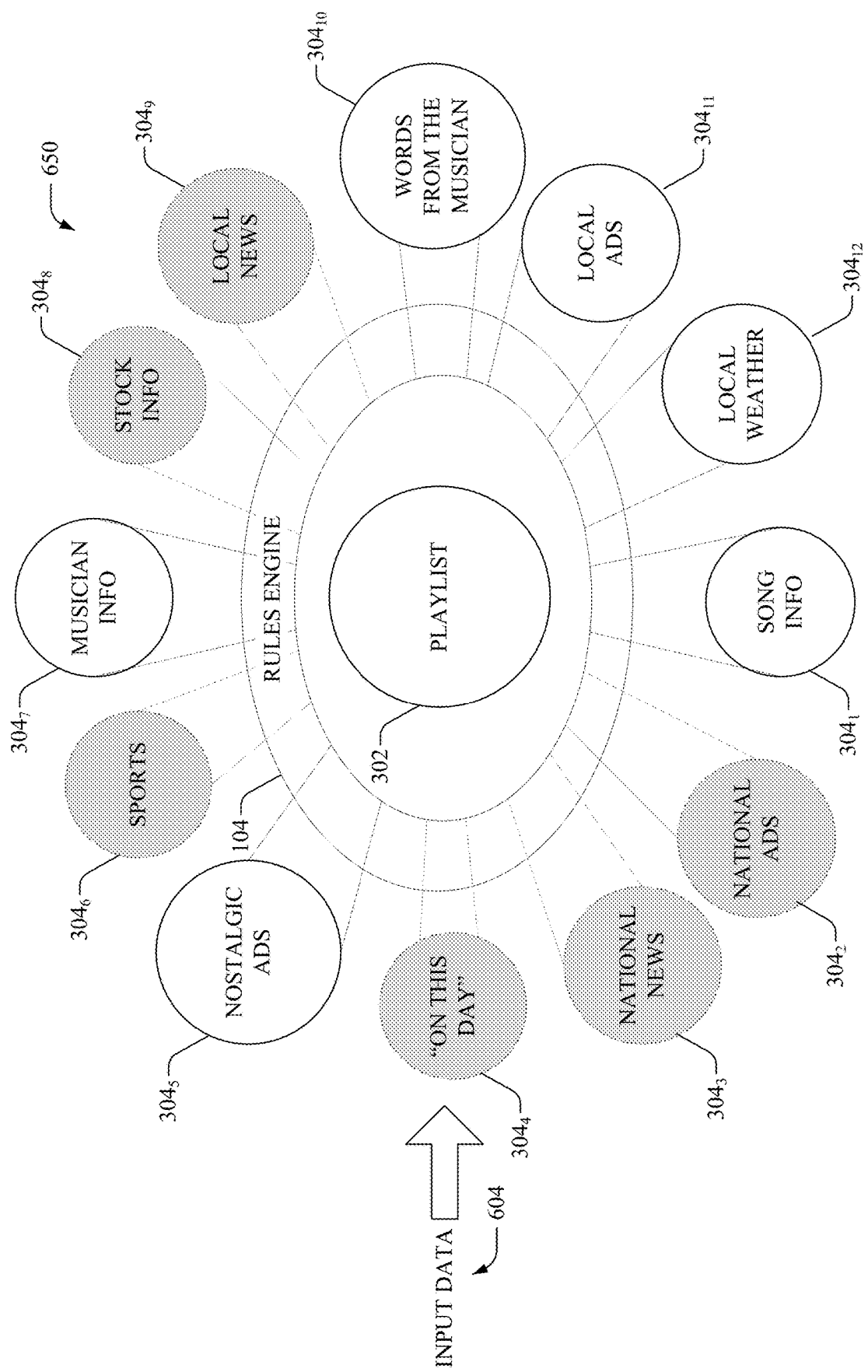
Figure 6C:
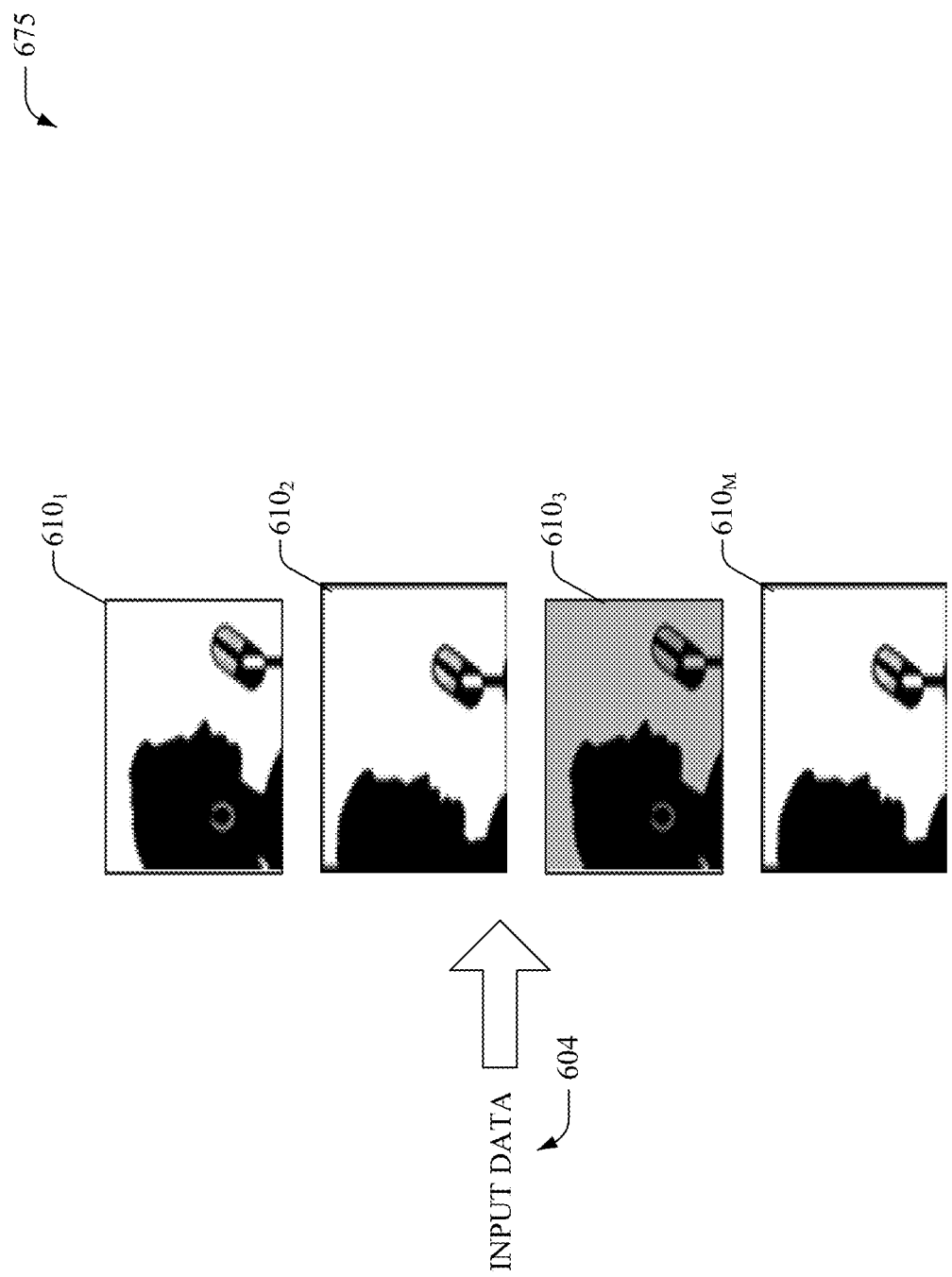

FIGS. 6A-6C illustrate example systems (600, 650, 675) for configuring the enhanced entertainment system, according to aspects of the disclosed subject matter. System 600 can reside (completely or partially) within most any UE or network device that has, or is coupled to, an I/O interface, such as, but not limited to a GUI. According to an aspect, system 600 can comprise a configuration component 602 that can receive input data 604 comprising user preference data 608 that can be stored in data store 606. Moreover, the user preference data 608 can be utilized by the rules engine 104 to facilitate a selection of supplemental data that is inserted within a playlist. In one aspect, the input data 604 can comprise selections for categories of supplemental information that the user is interested in viewing/listening. For example, as depicted in system 650, the input data 604 can be utilized to select (e.g. as depicted by the highlights) the national ads $304_2$, national news $304_3$, "on this day" $304_4$, sports $304_6$, stock information $304_8$, and local news $304_9$ categories. Additionally or optionally, the input data 604 can comprise a specific location of interest to the user (e.g., home location, work location, etc.), favorite sports teams, specific stocks, etc. Further, the input data can also be utilized to define user policies, for example, interrupt playlist if a weather alert has been issued, do not add videos longer than 30 seconds, play content suitable for children during 9 AM to 8 PM, etc. Furthermore, as depicted in system 675, the input data 604 can be utilized to select (e.g. as depicted by the highlights) one (or more) voice personalities $610_1$-$610_M$ (wherein M is most any natural number). In one example, the input data 604 can link different voice personalities $610_1$-$610_M$ to different time periods (e.g., present information in personality #1's voice in the morning and personality #2's voice in the evening) and/or different categories of information (e.g., present news in personality #1's voice, present sports data in personality #2's voice, etc.). The different voice personalities $610_1$-$610_M$ can be associated with different persons (e.g., RJ, DJ, and/or VJ) and/or avatars, for example, of different genders, having different accents and/or characteristics/traits (e.g., funny, sarcastic, articulate, appropriate for children, etc.) and the like.

Figure 7:
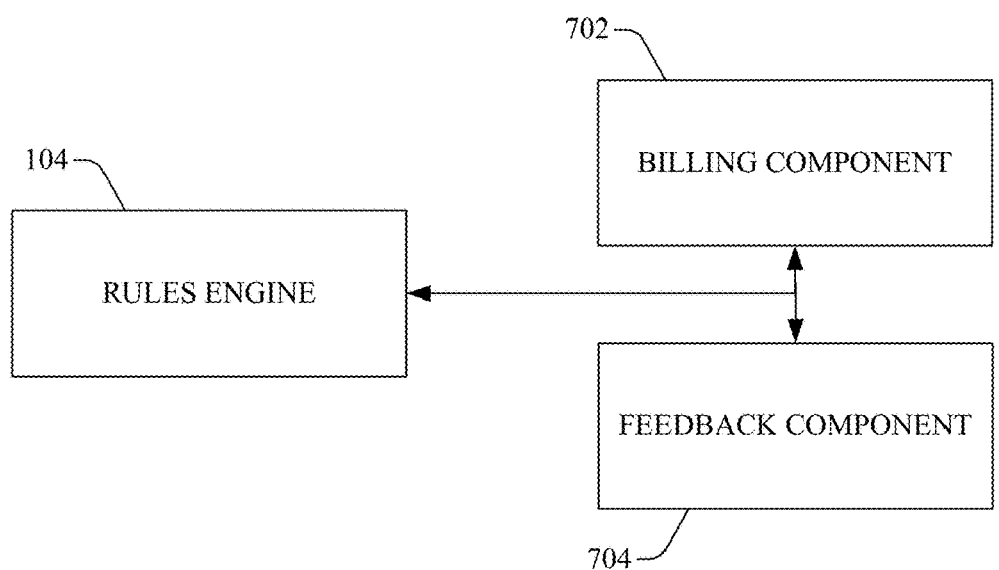
FIG. 7 illustrates an example system that facilitates billing and feedback for a user configured media experience.

FIG. 7 illustrates an example system 700 that facilitates billing and feedback for a user-configured media experience, according to aspects of the disclosed subject matter. It is noted that the rules engine 104 can comprise functionality as more fully described herein, for example, as described above with regard to systems 100, 300, and 600. In one aspect, a billing component 702 can be utilized to implement one or more billing schemes that determine a fee to be charged to a user account for utilization of the enhanced entertainment experience. In one example, a fee (e.g., periodic flat fee) can be charged to the user account and the user can be provided an ad-free experience. In another example, if a fee is not charged to the user account, the rules engine 104 can insert ads during the media transitions. Advertisers can be billed every time their ad is played. Moreover, the feedback component 704 can track the number of times the ad is played via a UE associated with the user account and accordingly, the billing component 702 can charge a fee to the advertiser. In yet another example, an additional periodic fee can be charged to the user account to include playlist rental. In this example, media objects (e.g., songs, videos, etc.) stored within the cloud/network can be accessed by the UE and the number of media objects that can be accessed at a given time can be restricted based on the fee (e.g., a higher fee can allow access to a larger number of media objects).

Figure 8:
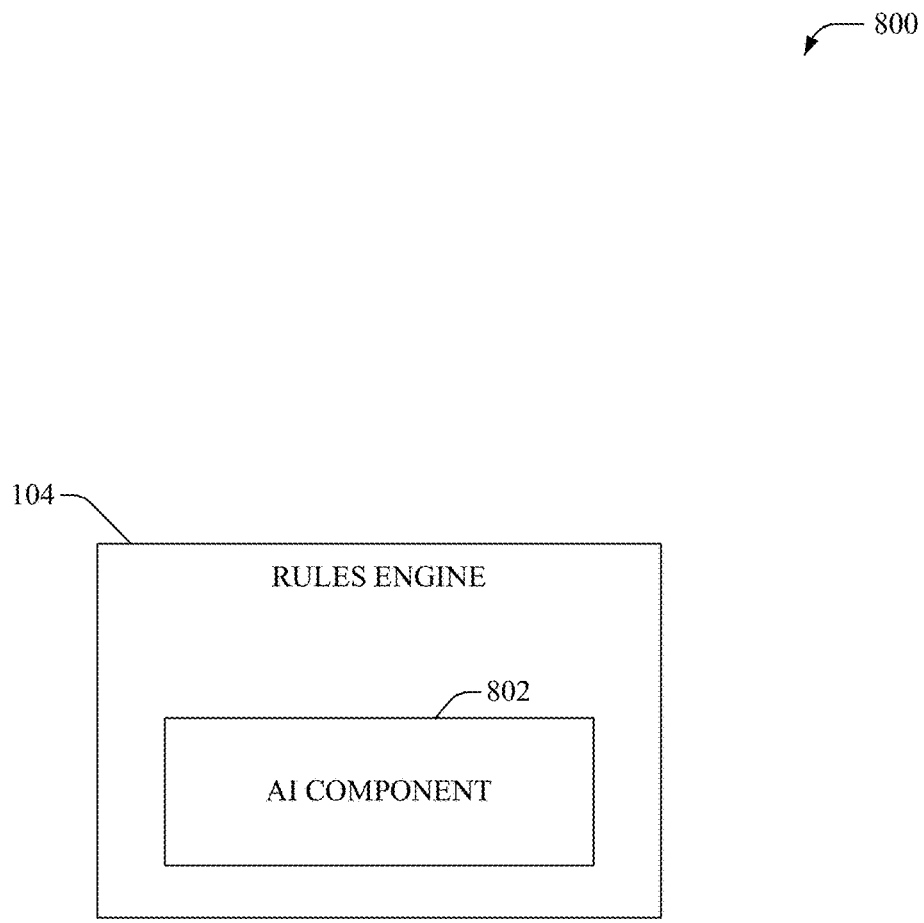
FIG. 8 illustrates an example system that facilitates automating one or more features in accordance with the subject embodiments.

Referring now to FIG. 8, there illustrated is an example system 800 that employs an artificial intelligence (AI) component (802) to facilitate automating one or more features in accordance with the subject embodiments. It is noted that the rules engine 104 can comprise functionality as more fully described herein, for example, as described above with regard to systems 100, 300, 600, and 700.

In an example embodiment, system 800 (e.g., in connection with automatically determining when and/or what supplemental media is to be played in a playlist) can employ various AI-based schemes (e.g., intelligent processing/analysis, machine learning, etc.) for carrying out various aspects thereof. Moreover, the AI component 802 can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning-to a data set. In particular, AI component 802 can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed.

As will be readily appreciated from the subject specification, an example embodiment can employ classifiers that are explicitly trained (e.g., via a generic training data) as well as implicitly trained (e.g., via observing device/user preferences, historical information, receiving extrinsic information, type of device, etc.). For example, SVMs can be configured via a learning or training phase within a classifier constructor and feature selection module. Thus, the classifier(s) of AI component 802 can be used to automatically learn and perform a number of functions, comprising determining according to a predetermined criteria, a type/category of supplemental information that is to be presented, how often the supplemental information is to be presented, when an ad is to be presented, a voice personality that presents the supplemental information, etc. The criteria can include, but is not limited to, previously presented supplemental media objects and/or ads, historical patterns and/or trends, user policies/preferences, feedback data, billing criteria, security parameters, service provider preferences and/or policies, event data, bandwidth data, resource availability data, current time/date, and the like.

Figure 9:
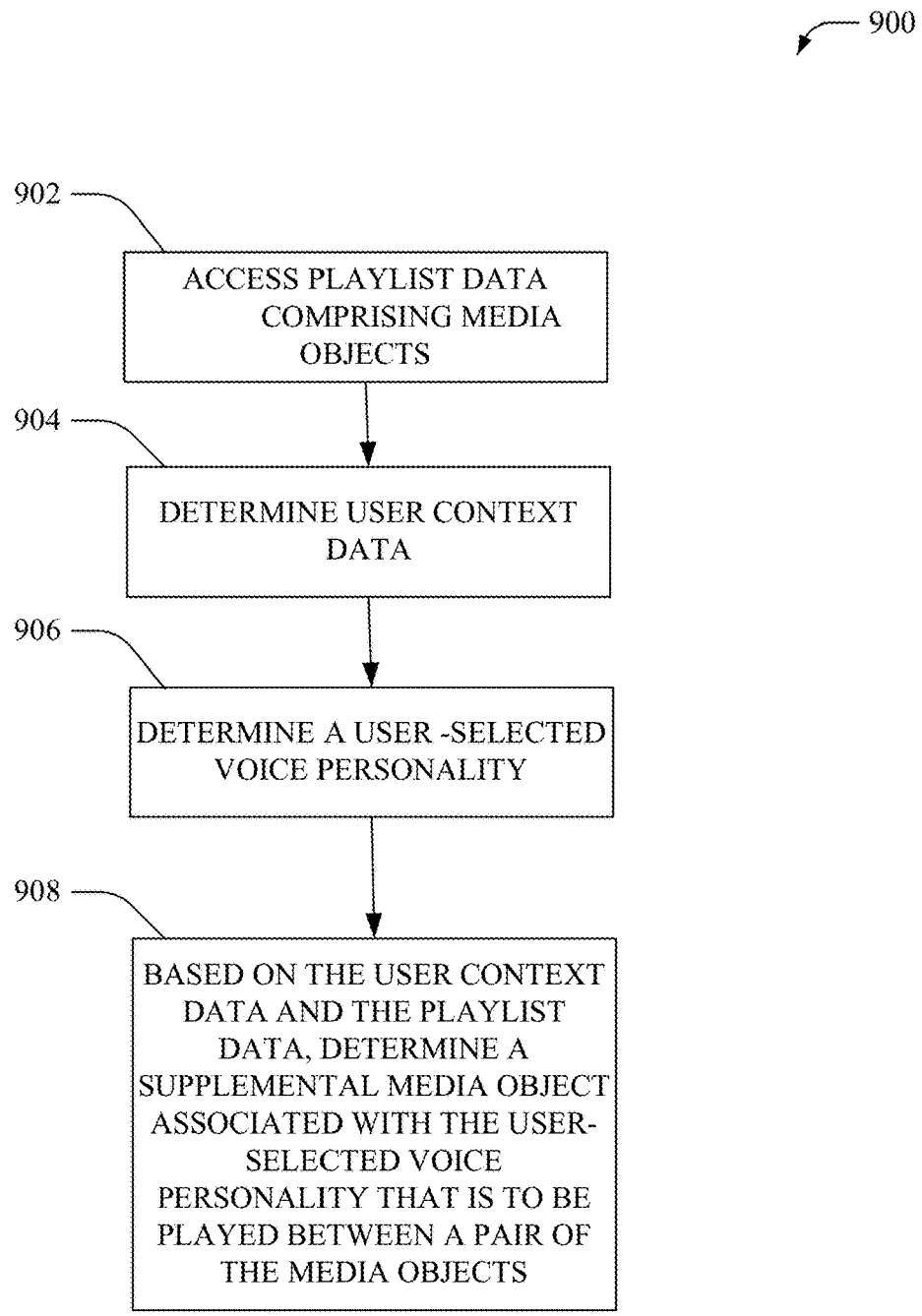
FIG. 9 illustrates an example method that facilitates providing an enhanced entertainment service to a user.
Figure 10:
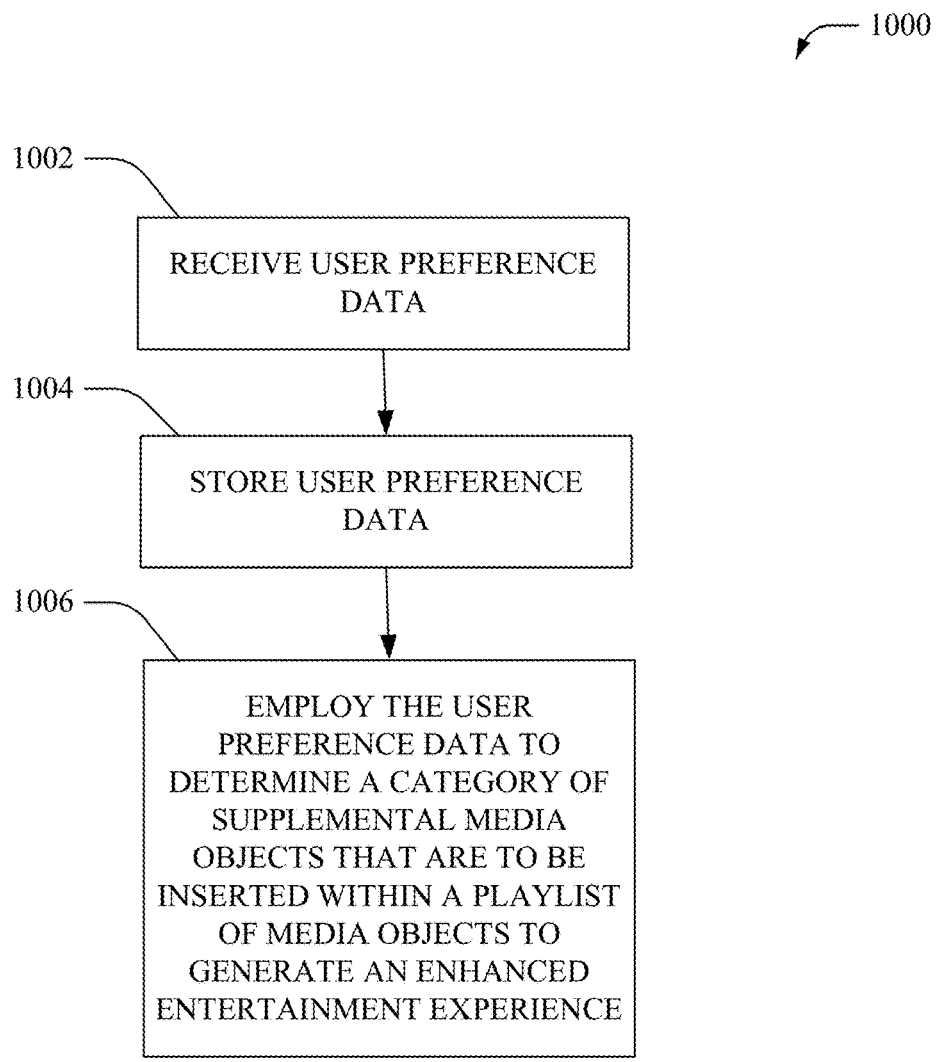
FIG. 10 illustrates an example method that facilitates configuration of user preferences.

FIGS. 9-10 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Referring now to FIG. 9 there illustrated is an example method 900 that facilitates providing an enhanced entertainment service to a user, according to an aspect of the subject disclosure. In an aspect, method 900 can be implemented (partially or completely) by a UE. At 902, playlist data comprising media objects (e.g., audio and/or video clips) can be accessed. In one example, the media objects can be stored in the UE. In another example, the media objects can be stored in a network data store coupled to the UE via a communication network (e.g., Wi-Fi network, cellular network, etc.). At 904, user context data can be determined. For example, the user context data can comprise user preferences (e.g., types of data of interest to the user), UE location data, UE characteristics, etc.

Further, at 906, a user-selected voice personality can be determined. As an example, the voice personality can be selected during configuration of the service. At 908, based on the user context data, playlist data (e.g., metadata related to the currently playing, recently played, or upcoming media object(s) in the playlist), a supplemental media object, associated with the user-selected voice personality, that is to be played between a pair of the media objects, can be determined. In an aspect, the supplemental media object can comprise a recording (e.g., audio and/or video file) of content (e.g., determined to be of interest to the user) by the user-selected voice personality. For example, the supplemental media object can comprise an audio clip of "news" being read in a voice that has been selected by the user. According to an embodiment, the supplemental media object can be accessed from the network data store. In one example, the network data store can maintain multiple media files associated with the same (or similar) content that are pre-recorded in different voices (and/or with different actors). In another example, a user-selected voice signature can be applied to the content stored in the network data store to dynamically generate the supplemental media object (e.g., based on voice synthesis).

FIG. 10 illustrates an example method 1000 that facilitates configuration of user preferences, according to an aspect of the subject disclosure. In an aspect, method 1000 can be implemented (partially or completely) by a UE. At 1002, user preference data can be received. As an example, the user preference data can be received via an input interface of the UE and/or via a web portal, associated with user account of the UE, accessed via an authorized device. In an aspect, the user preference data can comprise selections for categories of supplemental information that the user is interested in viewing/listening and/or a voice personality associated with the supplemental information. At 1004, the user preference data can be stored, for example, in a data store of the UE or a network/cloud data store coupled to the UE via a communication network. Further, at 1006, the user preference data can be employed to determine a category of supplemental media objects that are to be inserted within a playlist of media objects to generate an enhanced entertainment experience.

Figure 11:
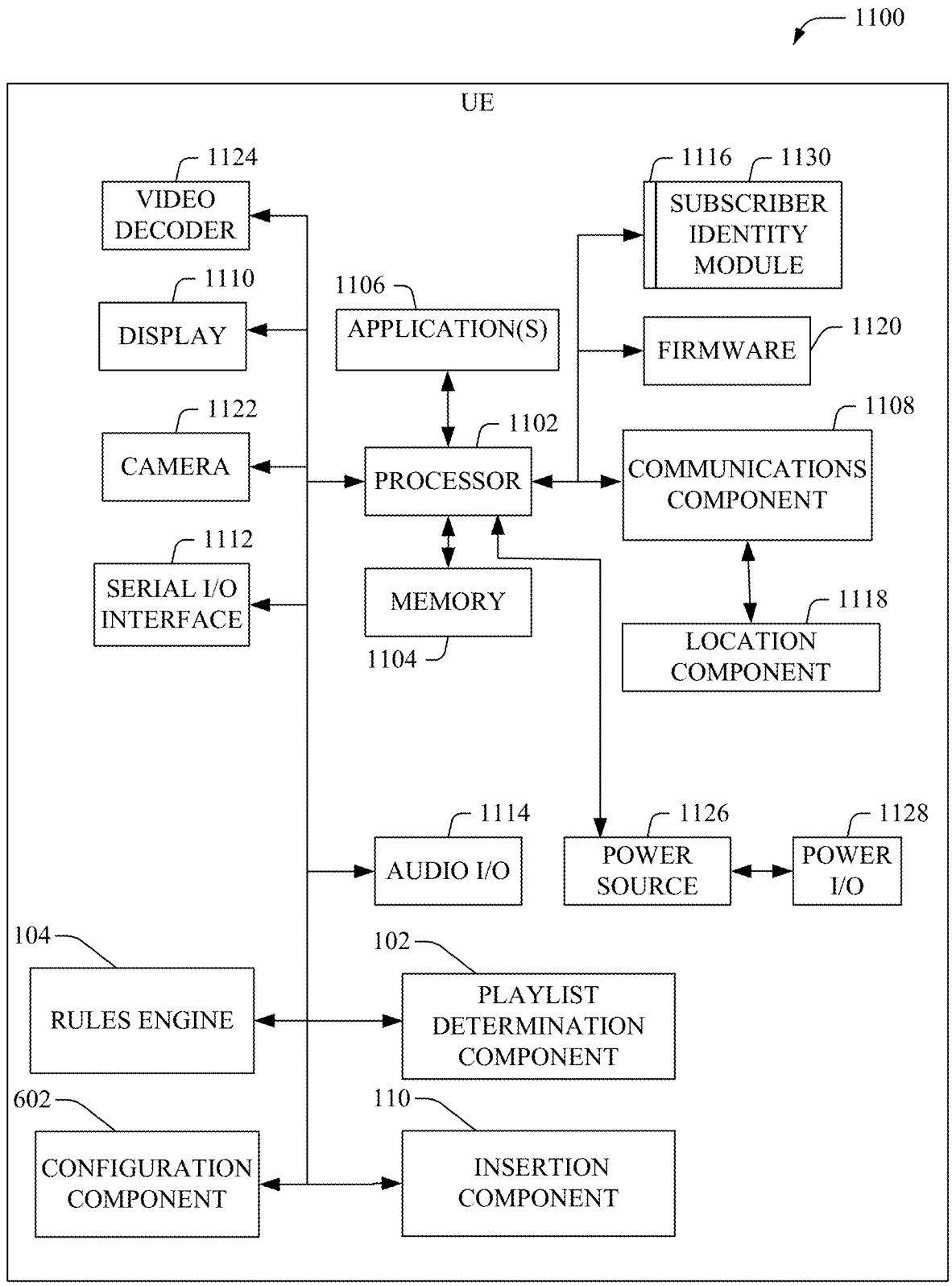
FIG. 11 illustrates an example block diagram of a user equipment suitable for providing a customized entertainment experience.

Referring now to FIG. 11, there is illustrated a block diagram of a UE 1100 that facilitates a customized entertainment experience in accordance with the subject specification. In one aspect, the UE 1100 can include a processor 1102 for controlling all onboard operations and processes. A memory 1104 can interface to the processor 1102 for storage of data (e.g., user context data 106, user preference data 608, etc.) and one or more applications 1106 (e.g., media player application) being executed by the processor 1102. A communications component 1108 can interface to the processor 1102 to facilitate wired/wireless communication with external systems (e.g., network data storage, cloud network devices, etc.). The communications component 1108 can interface to a location component 1118 (e.g., GPS transceiver) that can facilitate location detection of the UE 1100.

The UE 1100 can include a display 1110 (e.g., screen and/or touch screen) for displaying the media objects, received content (and/or content to be transferred) and/or for displaying text information related to operating and using the device features. A serial I/O interface 1112 is provided in communication with the processor 1102 to facilitate serial communication (e.g., USB, and/or IEEE 1394) via a hardwire connection. Audio capabilities are provided with an audio I/O component 1114, which can include a speaker for the output of audio signals related to, for example, the audio files, recorded data or telephony voice data, and a microphone for inputting voice signals for recording and/or telephone conversations.

Further, the UE 1100 can include a slot interface 1116 for accommodating a subscriber identity module (SIM) 1130. A unique CTN is associated with the SIM 1130 that can be utilized as a device identifier for UE 1100 and can link the UE 1100 to a user account (e.g., employed for billing and/or subscriptions). Firmware 1120 is also provided to store and provide to the processor 1102 startup and operational data. The UE 1100 can also include a media capture component 1122 such as a camera and/or a video decoder 1124 for decoding encoded multimedia content. Further, the UE 1100 can include a power source 1126 in the form of batteries, which power source 1126 interfaces to an external power system or charging equipment via a power I/O component 1128. In addition, the UE 1100 can comprise the playlist determination component 102, rules engine 104, the insertion component 110, and the configuration component 602, which can be stored in memory 1104 and/or implemented by an application 1106. The playlist determination component 102, rules engine 104, the insertion component 110, and the configuration component 602 can include respective functionality, as more fully described herein, for example, with regard to systems 100 and 300-800.

Figure 12:
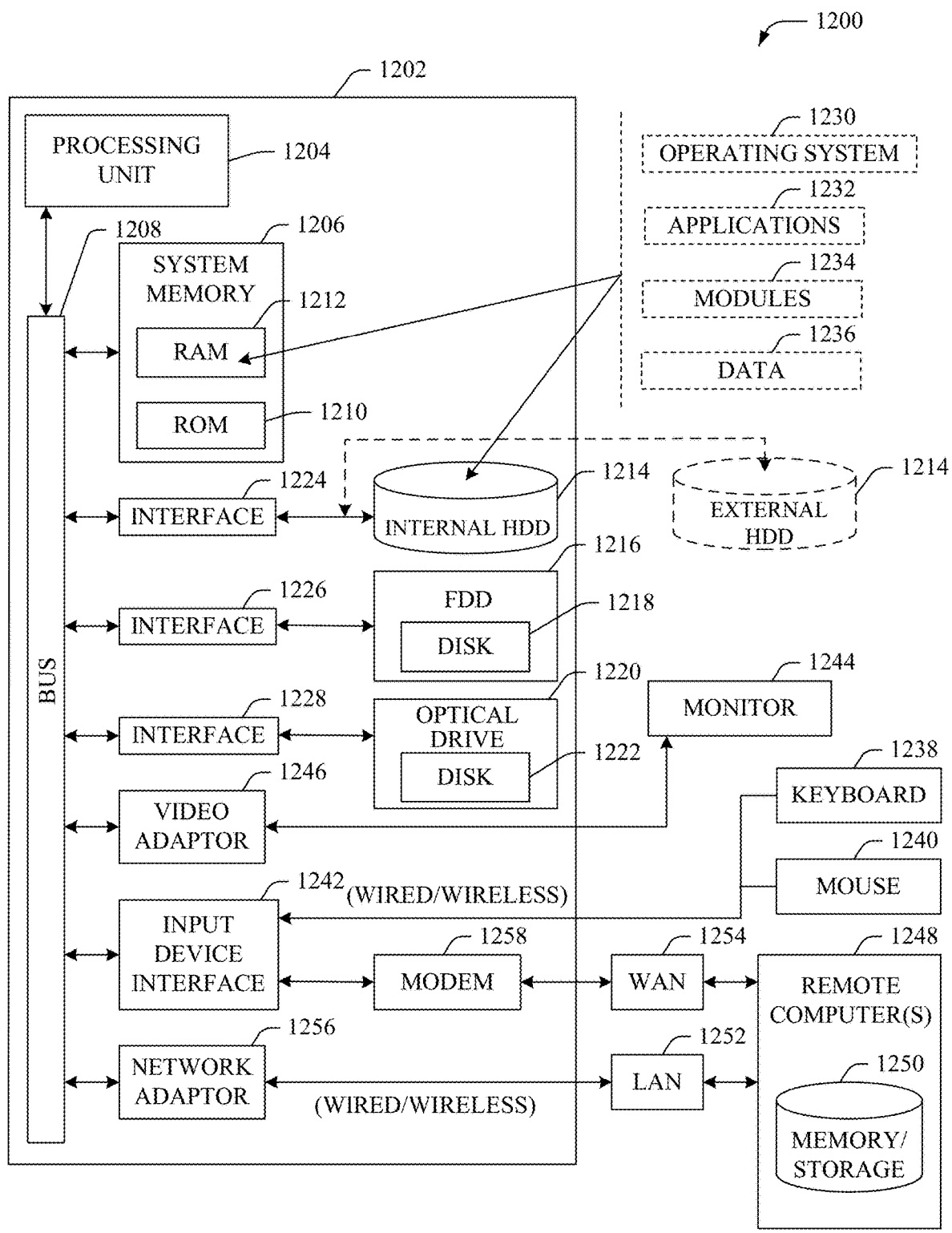
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules comprise routines, programs, components, data structures, etc., that perform particular tasks or implement particular abstract data types. Moreover, those skilled in the art will appreciate that the inventive methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 12, the example environment 1200 for implementing various aspects of the specification comprises a computer 1202, the computer 1202 comprising a processing unit 1204, a system memory 1206 and a system bus 1208. As an example, the component(s), application(s) server(s), equipment, system(s), interface(s), gateway(s), controller(s), node(s), engine(s) and/or device(s) (e.g., playlist determination component 102, rules engine 104, insertion component 110, network device(s) 202, data retrieval component 204, content sources 206, network data store(s) 208, synthesis component 210, communication component 214, configuration component 602, data store 606, billing component 702, feedback component 704, AI component 802, UE 1100, etc.) disclosed herein with respect to systems 100-300, 600, 650, 700, 800, and 1100 can each comprise at least a portion of the computer 1202. The system bus 1208 couples system components including, but not limited to, the system memory 1206 to the processing unit 1204. The processing unit 1204 can be any of various commercially available processors. Dual microprocessors and other multiprocessor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 comprises read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also comprise a high-speed RAM such as static RAM for caching data.

The computer 1202 further comprises an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations comprises at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, comprising an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically comprises many or all of the elements described relative to the computer 1202, although, for purposes of brevity, only a memory/storage device 1250 is illustrated. The logical connections depicted comprise wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also comprise a wireless AP disposed thereon for communicating with the wireless adapter 1256.

When used in a WAN networking environment, the computer 1202 can comprise a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least Wi-Fi and Bluetooth™ wireless technologies or other communication technologies. Thus, the communication can be a predefined structure as with a conventional network or simply an ad hoc communication between at least two devices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can comprise both volatile and nonvolatile memory. By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRDRAM). Additionally, the disclosed memory components of systems or methods herein are intended to comprise, without being limited to comprising, these and any other suitable types of memory.

Figure 13:
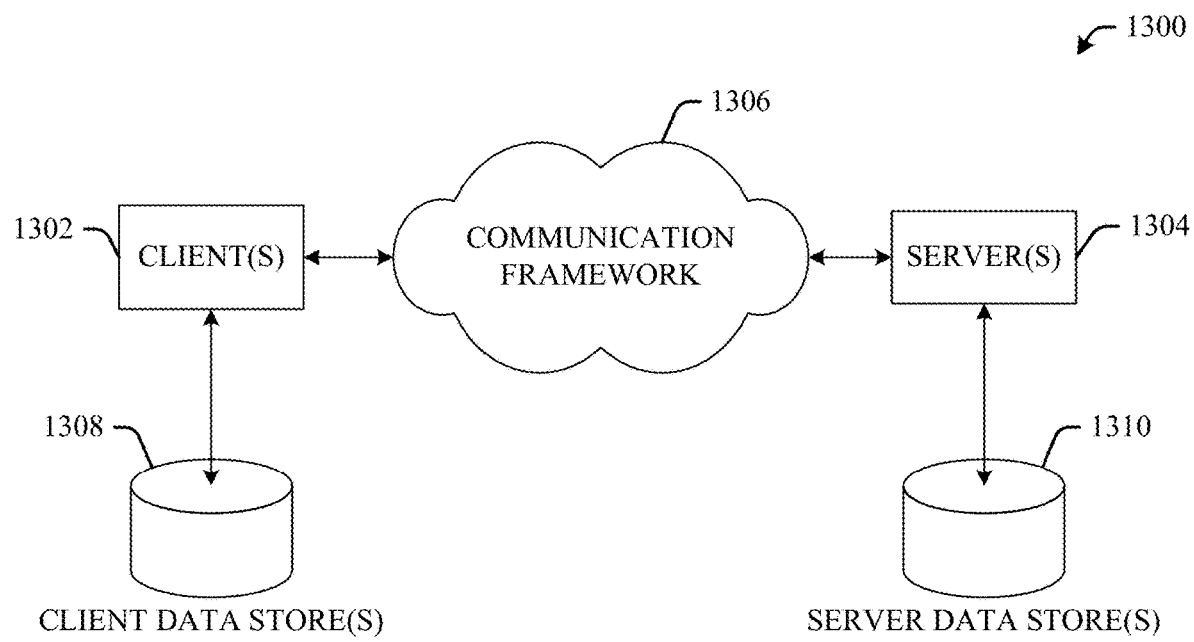
FIG. 13 illustrates a schematic block diagram of a computing environment in accordance with the subject specification.

Referring now to FIG. 13, there is illustrated a schematic block diagram of a computing environment 1300 in accordance with the subject specification. The system 1300 comprises one or more client(s) 1302. The client(s) 1302 can be hardware and/or software (e.g., threads, processes, computing devices).

The system 1300 also comprises one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may comprise a cookie and/or associated contextual information, for example. The system 1300 comprises a communication framework 1306 (e.g., a global communication network such as the Internet, cellular network, etc.) that can be employed to facilitate communications between the client(s) 1302 and the server(s) 1304.

Communications can be facilitated via a wired (comprising optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above comprises examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
receiving, by network equipment comprising a processor, a selection of playlist data associated with a user equipment, the selection of the playlist data comprising indications of media objects playable by the user equipment;

based on user profile data corresponding to a user identity associated with the user equipment, determining, by the network equipment, supplemental objects that are to be played between the media objects, wherein the determining comprises determining respective playback insertion frequencies of the supplemental objects and respective durations of the supplemental objects, wherein the supplemental objects comprise media files that are employable to be rendered during transitions between the media objects, and wherein the supplemental objects comprise an advertisement that was broadcast during a time period associated with a media object of the media objects; and sending, by the network equipment, the supplemental objects from the network equipment to the user equipment.

2. The method of claim 1, wherein determining the supplemental objects is based on user context data associated with the user equipment.

3. The method of claim 2, wherein the user context data comprises at least one of user preferences of the user identity associated with the user equipment, historical data associated with the user equipment, a current date and a current time associated with the user equipment, user equipment location data associated with a location of the user equipment, and metadata associated with the media objects.

4. The method of claim 3, wherein determining the supplemental objects comprises determining the supplemental objects according to a result of an artificial intelligence analysis, performed by the network equipment that learns the user context data.

5. The method of claim 1, further comprising determining, by the network equipment, a voice signature to be applied to a supplemental object of the supplemental objects.

6. The method of claim 5, further comprising, using, by the network equipment, the voice signature to synthesize the supplemental object of the supplemental objects.

7. The method of claim 1, wherein a supplemental object of the supplemental objects further comprises selected information from a group of information, the group of information comprising advertisement information, news information, historical event information, trivia information, on this day information related to a particular date, musician information related to a media object of the media objects, song information related to the media object of the media objects, musician words related to the media object of the media objects, inspirational quote information related to inspirational quotes, and sound clip information related to the media object of the media objects.

8. The method of claim 1, wherein the sending of the supplemental objects from the network equipment to the user equipment comprises streaming the media objects and the supplemental objects to the user equipment.

9. The method of claim 1, wherein the media objects and the supplemental objects comprise at least one of images or videos.

10. A system, comprising:
a processor; and
a memory that stores executable instructions that, when executed by the processor, facilitate performance of operations, comprising:
accessing playlist data representative of a playlist comprising media objects to be rendered, wherein the playlist is associated with a subscriber identity;

analyzing the playlist data and subscriber profile data associated with the subscriber identity to determine supplemental information, supplemental information frequency of insertion, and supplemental information duration for presentation to a subscriber device associated with the subscriber identity, wherein the supplemental information comprises media files that are employable to modify an entertainment experience to include playback of the supplemental information during transitions between the media objects;

selecting, based on input data that links different voice personalities to different categories of supplemental information, a voice personality for application to the supplemental information; and rendering, between media objects of the media objects, the supplemental information comprising rendering the supplemental information using voice information based on the voice personality.

11. The system of claim 10, wherein analyzing the playlist data to determine the supplemental information for the presentation to the subscriber device comprises determining a category for the supplemental information.

12. The system of claim 11, wherein determining the category for the supplemental information comprises analyzing context information related to the subscriber identity, the context information comprising at least one of location data and subscriber attributes associated with the subscriber identity.

13. The system of claim 10, wherein the input data, which links different voice personalities to different categories of supplemental information, comprises subscriber preference data representative of a subscriber preference.

14. The system of claim 10, wherein the supplemental information comprises an introduction of a next media object of the media objects, and wherein the introduction comprises the voice personality for application to the supplemental information.

15. The system of claim 10, wherein the supplemental information comprises at least one of advertisement information indicative of an advertisement that was broadcast during a time period associated with a media object of the media objects, news information, historical event information, or trivia information related to the media object of the media objects.

16. The system of claim 15, wherein the supplemental information comprises a synthesized introduction of the supplemental information, rendered using a voice signature corresponding to the voice personality for application to the supplemental information.

17. The system of claim 10, wherein the media objects and the supplemental information comprise audio segments or images.

18. A non-transitory machine-readable medium, comprising executable instructions that, when executed by a processor, facilitate performance of operations, comprising:

receiving input representative of playlist data, wherein the input representative of playlist data comprises indications of media objects;

based on user profile data representative of information associated with a user identity, determining supplemental objects, a supplemental object frequency, and a supplemental object duration, wherein the supplemental objects are to be played between the media objects, wherein the supplemental objects comprise media files that are employable to create a custom entertainment experience comprising playback of the supplemental objects during transitions between the media objects, and wherein the supplemental objects comprise information selected from a group of information, the group of information comprising news information, weather information, trivia information, stock information, advertisement information and historical information;

determining a category of supplemental media objects that are to be inserted within the media objects to generate the custom entertainment experience;

selecting, based on the category of supplemental media objects and input data that links different voice personalities to different categories of supplemental media objects, a voice personality for application to a supplemental object of the supplemental objects, resulting in a selected voice personality;

synthesizing an introduction of the supplemental object of the supplemental objects, wherein the introduction is in the voice personality; and inserting the supplemental object of the supplemental objects and the introduction of the supplemental object of the supplemental objects among the media objects.

19. The non-transitory machine-readable medium of claim 18, wherein the introduction further comprises an introduction of a next media object of the media objects, wherein the inserting comprises inserting the introduction of the next media object of the media objects, and wherein the supplemental object of the supplemental objects comprises advertisement information indicative of an advertisement that was broadcast during a time period associated with a media object of the media objects.

20. The non-transitory machine-readable medium of claim 18, wherein the selecting the voice personality for the supplemental object of the supplemental objects is performed based on a result of an artificial intelligence analysis.

* * * * *